(12) United States Patent
Huang et al.

(10) Patent No.: US 8,250,651 B2
(45) Date of Patent: Aug. 21, 2012

(54) IDENTIFYING ATTRIBUTES OF AGGREGATED DATA

(75) Inventors: Song Huang, Beijing (CN); Yingnong Dang, Beijing (CN); Xiaohui Hou, Beijing (CN); Dongmei Zhang, Redmond, WA (US); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 916 days.

(21) Appl. No.: 11/823,546

(22) Filed: Jun. 28, 2007

(65) Prior Publication Data

US 2009/0007271 A1    Jan. 1, 2009

(51) Int. Cl.
H04L 29/06    (2006.01)

(52) U.S. Cl. ............................. 726/22; 726/25

(58) Field of Classification Search .............. 726/22, 726/25
See application file for complete search history.

(56) References Cited

U.S. PATENT DOCUMENTS

| | | | |
|---|---|---|---|
| 4,550,436 A | 10/1985 | Freeman et al. | |
| 5,767,854 A | 6/1998 | Anwar | |
| 5,838,965 A * | 11/1998 | Kavanagh et al. | ............. 1/1 |
| 5,841,895 A | 11/1998 | Huffman | |
| 5,946,481 A * | 8/1999 | Kurshan et al. | ............ 703/13 |
| 6,070,244 A | 5/2000 | Orchier et al. | |
| 6,301,579 B1 | 10/2001 | Becker | |
| 6,466,211 B1 | 10/2002 | Havre et al. | |
| 6,675,350 B1 | 1/2004 | Abrams et al. | |
| 6,707,454 B1 | 3/2004 | Barg et al. | |
| 6,772,348 B1 | 8/2004 | Ye | |
| 6,842,176 B2 | 1/2005 | Sang'udi et al. | |
| 6,961,732 B2 | 11/2005 | Hellemann et al. | |
| 6,995,768 B2 | 2/2006 | Jou et al. | |
| 7,082,044 B2 | 7/2006 | Gould et al. | |
| 7,117,199 B2 * | 10/2006 | Frank et al. | ............. 1/1 |
| 7,143,055 B1 | 11/2006 | Perkowski | |
| 7,149,968 B1 | 12/2006 | Ackerschewski et al. | |
| 7,159,237 B2 | 1/2007 | Schneier et al. | |
| 7,182,257 B2 | 2/2007 | Ogihara et al. | |
| 7,287,230 B2 | 10/2007 | Austin et al. | |
| 7,322,047 B2 | 1/2008 | Redlich et al. | |

(Continued)

FOREIGN PATENT DOCUMENTS

WO    2006048796 A1    11/2006

(Continued)

OTHER PUBLICATIONS

Security Tracker; SecurityTracker.com Vulnerability Notification Service Product Brochure [online]; Mar. 15, 2006 [retrived on Jun. 10, 2010]; SecurityTracker; Retrieved from the Internet: <URL:http://web.archive.org/web/20060315063009/http://securitytracker.com/learn/securitytracker-services.pdf>; pp. 1-4.*

(Continued)

*Primary Examiner* — Yin-Chen Shaw
*Assistant Examiner* — Bradley Holder

(57) ABSTRACT

A method for identifying a portion of aggregated software security data is described. The method includes accessing aggregated data associated with software vulnerabilities retrieved from a plurality of on-line sources. The method further includes searching a portion of the aggregated data for an exact match to a particular attribute of the data and searching the portion of the aggregated data for one or more partial matches associated with the particular attribute. The method also includes associating the portion of the data with the particular attribute based on the exact match of one or more of the partial matches.

20 Claims, 9 Drawing Sheets

U.S. PATENT DOCUMENTS

| | | | |
|---|---|---|---|
| 7,539,693 B2* | 5/2009 | Frank et al. | 1/1 |
| 7,596,581 B2* | 9/2009 | Frank et al. | 1/1 |
| 7,603,350 B1 | 10/2009 | Guha | |
| 7,607,169 B1 | 10/2009 | Njemanze et al. | |
| 7,681,121 B2* | 3/2010 | Nishikawa et al. | 715/243 |
| 7,685,201 B2 | 3/2010 | Zeng et al. | |
| 7,694,328 B2 | 4/2010 | Joshi et al. | |
| 7,761,423 B1 | 7/2010 | Cohen | |
| 7,774,360 B2 | 8/2010 | Sun et al. | |
| 2002/0007309 A1 | 1/2002 | Reynar | |
| 2002/0078381 A1 | 6/2002 | Farley et al. | |
| 2002/0144142 A1 | 10/2002 | Shohat | |
| 2003/0097378 A1* | 5/2003 | Pham et al. | 707/200 |
| 2003/0120684 A1 | 6/2003 | Zuili et al. | |
| 2003/0120949 A1 | 6/2003 | Redlich et al. | |
| 2003/0135445 A1 | 7/2003 | Herz et al. | |
| 2004/0034550 A1 | 2/2004 | Menschik et al. | |
| 2004/0064722 A1 | 4/2004 | Neelay et al. | |
| 2004/0088565 A1 | 5/2004 | Norman et al. | |
| 2004/0126017 A1 | 7/2004 | Seni et al. | |
| 2004/0183800 A1 | 9/2004 | Peterson | |
| 2005/0060667 A1 | 3/2005 | Robbins | |
| 2005/0071332 A1* | 3/2005 | Ortega et al. | 707/4 |
| 2005/0102534 A1 | 5/2005 | Wong | |
| 2005/0108630 A1* | 5/2005 | Wasson et al. | 715/513 |
| 2005/0132342 A1 | 6/2005 | Van Lunteren | |
| 2005/0198110 A1 | 9/2005 | Garms et al. | |
| 2005/0204150 A1 | 9/2005 | Peikari | |
| 2005/0246420 A1 | 11/2005 | Little, II | |
| 2005/0246773 A1 | 11/2005 | Draine et al. | |
| 2005/0251509 A1 | 11/2005 | Pontius | |
| 2005/0273861 A1 | 12/2005 | Chess et al. | |
| 2006/0004725 A1* | 1/2006 | Abraido-Fandino | 707/3 |
| 2006/0021050 A1 | 1/2006 | Cook et al. | |
| 2006/0021054 A1 | 1/2006 | Costa et al. | |
| 2006/0047500 A1 | 3/2006 | Humphreys et al. | |
| 2006/0259974 A1 | 11/2006 | Marinescu et al. | |
| 2007/0011323 A1 | 1/2007 | Gaal | |
| 2007/0011734 A1 | 1/2007 | Balakrishnan et al. | |
| 2007/0011741 A1 | 1/2007 | Robert et al. | |
| 2007/0022023 A1 | 1/2007 | Capomassi et al. | |
| 2007/0198510 A1 | 8/2007 | Ebanks | |
| 2007/0233782 A1 | 10/2007 | Tali | |
| 2007/0271235 A1* | 11/2007 | Frank et al. | 707/3 |
| 2008/0034059 A1 | 2/2008 | Garg et al. | |
| 2008/0065646 A1 | 3/2008 | Zhang et al. | |
| 2008/0104024 A1 | 5/2008 | Kumar et al. | |
| 2008/0172630 A1 | 7/2008 | Dang et al. | |
| 2008/0270915 A1 | 10/2008 | Tevanian et al. | |
| 2009/0007272 A1 | 1/2009 | Huang et al. | |
| 2009/0077666 A1 | 3/2009 | Chen et al. | |
| 2010/0030894 A1 | 2/2010 | Cancel et al. | |
| 2010/0083382 A1 | 4/2010 | Farley et al. | |
| 2010/0185611 A1 | 7/2010 | Liao et al. | |

FOREIGN PATENT DOCUMENTS

WO 2006130947 A1 12/2006

OTHER PUBLICATIONS

"TS.Census", Date: 2003, pp. 1-2.

Hobbs, et al., "FASTUS: A System for Extracting Information from Text", pp. 133-137.

Liang, et al., "A Pattern Matching and Clustering Based Approach for Supporting Requirements Transformation", Proceedings of the First International Conference on Requirements Engineering, Date: 1994, pp. 180-183.

Nilsson, et al., "Towards automatic recognition of product names: an exploratory study of brand names in economic texts", Proceedings of the 15th Nodalida conference, Joensuu 2005, Date: 2005, p. 146-155.

Thompson, et al., "Name Searching and Information Retrieval", Date: Jun. 19, 1997, pp. 1-13.

http://secunia.com, retrieved on Mar. 28, 2012, 1 page.

Google Analytics screen shots (16 Pages), Nov. 25, 2005.

http://www.vupen.com/english/m, retrieved on Mar. 28, 2012, 1 page.

Durant, "Web Queries and Dynamic Chart Data in Excel 2002", available at: <http://msdn.microsoft.com/enus/library/ aa140050.aspx>, Jun. 2003, 16 pages.

Lengler et al., "Towards a Periodic Table of Visualization Methods for Management", Proceeding 562 of the Graphics and Visualization in Engineering, Jan. 5, 2007, 6 Pages.

Krishnan et ai, "Scalable Visual Analytics of Massive Textual Databasets," Webpage available at: <http://infoviz.pnl.gov/pdf/inspire_ipdps.pdf>, 2007, pp. 1-10.

Galloway et al., "Network Data Mining: Methods and Techniques for Discovering Deep Linkage between Attributes", Conferences in Research and Practice Information Technology Series, vol. 166, 2006, pp. 21-32.

Buja, et al., "Interactive Data Visualization using Focusing and Linking". Proceedings of the 2nd conference on Visualization 1991, IEEE Computer Society Press, 1991, pp. 156-163.

Jankun-Kelly et al.,"Visualization Exploration and Encapsulation via a Spreadsheet-like Interface",Centre for Image Processing and Integrated Computing, Computer Science department, University of California, Davis, Computer Science Department Technical Report, CSE-2002-13, Jul./Sep. 2001, pp. 1-13.

Jankun-Kelly et al., "Focus+Context Display of the Visualization Process", CSE-2002-13, Computer Science Deparment, University of California, Davis, 2002, pp. 1-7.

http://www.securityfocus.com, Retrieved on Mar. 28, 2012, 2 pages.

http://gmane.org, Retrieved on Mar. 28, 2012, 1 page.

Security Tracker.com, "Security Tracker Vulnerability Notification Service FAQ", Feb. 2002, 4 Pages.

Security Tracker.com, "Security Tracker Product Brochure", Dec. 2002, 4 Pages.

Sotirov, "Automatic Vulnerability Detection Using Static Source Code Analysis", Date: 2005, pp. 118, Tuscaloosa, Alabama.

Newsome, et al., "Dynamic Taint Analysis for Automatic Detection, Analysis, and Signature Generation of Exploits on Commodity Software", May 2004, last updated Jul. 2005, pp. 39.

Brugger et al., "Data Mining for Security Information: A Survey", 8th Association for Computing Machinery Conference on Computer & Communications Security, Apr. 19, 2001, 10 pgs.

Yao et al., "Rule + Exception Strategies for Security Information Analysis", IEEE Intelligent Systems, vol. 20 (5), 2005, pp. 52-57.

Newsome, et al., "Vulnerability-Specific Execution Filtering for Exploit Prevention on Commodity Software", 2005, pp. 1-14.

Ozmutlu et al., "An Architecture for SCS: A Specialized Web Crawler on the Topic of Security", Proceedings of the American Society of Information Science and Technology, v41, 2004, pp. 317-326.

Lynch, "When Documents Deceive: Trust and Provenance as New factors for Information Retrieval in a Tangled Web", Journal of American Soc. for Information Science and Technology, 52(1), 2001, pp. 12-17.

Zitser, et al., "Testing Static Analysis Tools using Exploitable Buffer Overflows from Open Source Code", Date: Oct.31-Nov. 6, 2004, ACM, New York, USA, pp. 97-106.

\* cited by examiner

IDENTIFYING ATTRIBUTES OF AGGREGATED DATA

BACKGROUND

Software security is closely monitored to help prevent security problems. At any time, numerous viruses and/or malware attempt to attack known and unknown public and private vulnerabilities. Software security management is an essential part of elevating software reliability and quality.

To help organize software vulnerability information, many vendors provide an on-line bulletin board for posting related fixes and alerts. In addition to vendor specific security bulletin boards, other sites have been created, mostly by IT administrators, which enable software users to post vulnerabilities and/or fixes to vulnerabilities. In addition, some sites or mailing lists allow users to discuss software security related technologies.

One problem is that the information is not always accurate and/or latest. Furthermore, to find specific vulnerabilities and/or fixes, a user may need to perform an extensive search before finding the right content.

The various locations for software vulnerabilities and untrusted information can lead to complications with user interaction with these sites.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method for identifying a portion of aggregated data is described. The method includes accessing aggregated data associated retrieved from a plurality of on-line sources. The method further includes searching a portion of the aggregated data for an exact match to a particular attribute of the data and searching the portion of the aggregated data for one or more partial matches associated with the particular attribute. The method also includes associating the portion of the data with the particular attribute based on the exact match of one or more of the partial matches.

DESCRIPTION OF THE DRAWINGS

The accompanying drawings, which are incorporated in and form a part of this specification, illustrate embodiments of the technology for identifying attributes of aggregated data and, together with the description, serve to explain principles discussed below.

The drawings referred to in this description should be understood as not being drawn to scale except if specifically noted.

DETAILED DESCRIPTION

Reference will now be made in detail to embodiments of the present technology for identifying attributes of software security data, examples of which are illustrated in the accompanying drawings. While the technology for identifying attributes of software security data will be described in conjunction with various embodiments, it will be understood that they are not intended to limit the present technology for identifying attributes of software security data to these embodiments. On the contrary, the presented technology for identifying attributes of software security data is intended to cover alternatives, modifications and equivalents, which may be included within the spirit and scope the various embodiments as defined by the appended claims.

Furthermore, in the following detailed description, numerous specific details are set forth in order to provide a thorough understanding of the present technology for identifying attributes of software security data. However, the present technology for identifying attributes of software security data may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "mapping", "segmenting", "routing", "interfacing", "recognizing", "representing", "emulating", "detecting", "exposing", "converting", "authenticating", "communicating", "sharing", "receiving", "performing", "generating", "displaying", "enabling", "aggregating", "highlighting", "presenting", "configuring", "identifying", "reporting", "ensuring", "suppressing", "disabling", "ending", "providing", and "accessing" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology for identifying attributes of software security data is also well suited to the use of other computer systems such as, for example, optical and mechanical computers.

Example Computer System Environment

Figure 1:
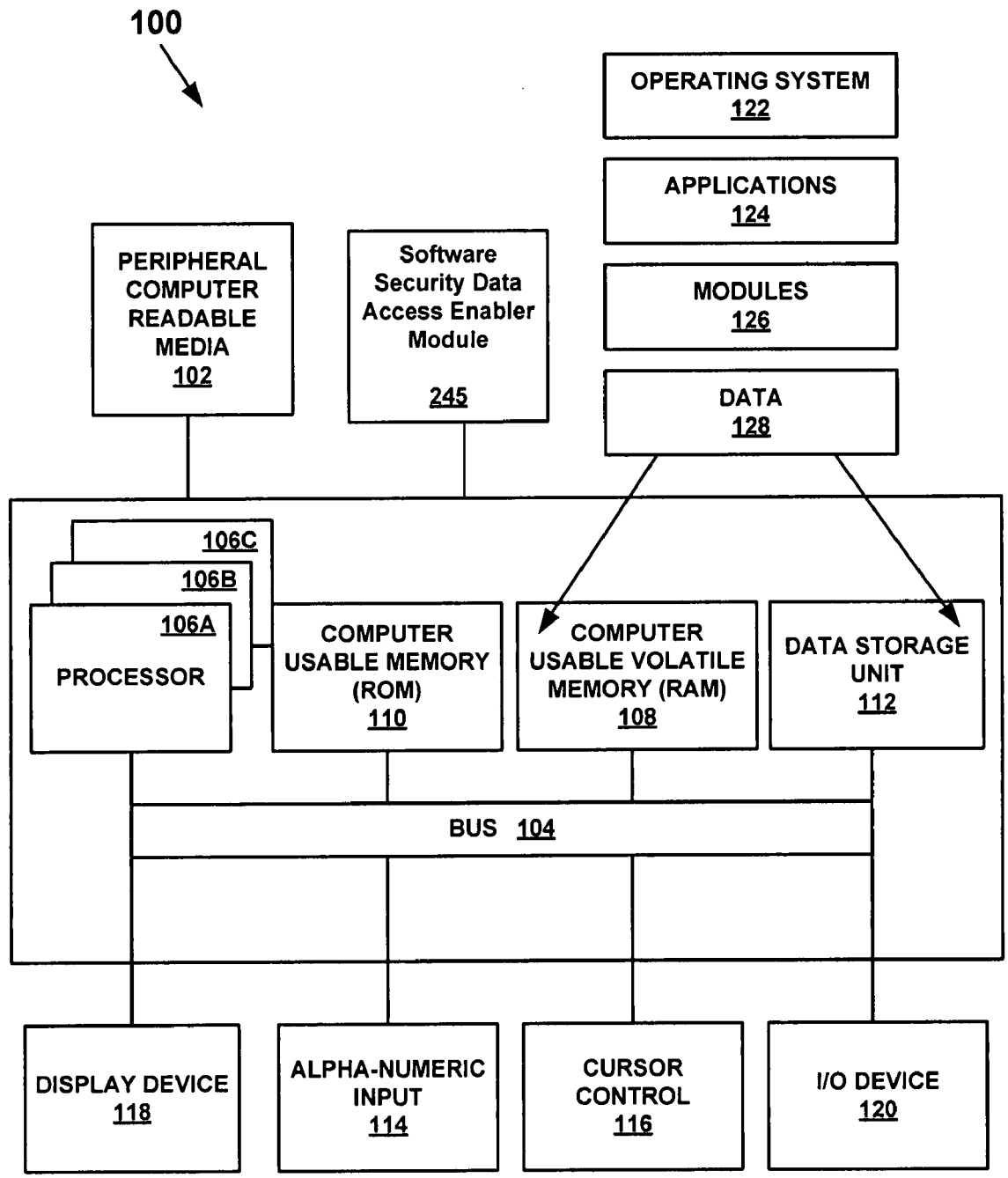
FIG. 1 is a diagram of an exemplary computer system used in accordance with embodiments of the present technology for identifying attributes of software security data.

With reference now to FIG. 1, portions of the technology for enabling access to software security data are composed of computer-readable and computer-executable instructions that reside, for example, in computer-usable media of a computer system. That is, FIG. 1 illustrates one example of a type of computer that can be used to implement embodiments, which are discussed below, of the present technology for enabling access to software security data.

FIG. 1 illustrates an exemplary computer system 100 used in accordance with embodiments of the present technology for enabling access to software security data. It is appreciated that system 100 of FIG. 1 is exemplary only and that the present technology for enabling access to software security data can operate on or within a number of different computer systems including general purpose networked computer systems, embedded computer systems, routers, switches, server devices, consumer devices, various intermediate devices/artifacts, stand alone computer systems, and the like. As shown in FIG. 1, computer system 100 of FIG. 1 is well adapted to having peripheral computer readable media 102 such as, for example, a floppy disk, a compact disc, and the like coupled thereto.

System 100 of FIG. 1 includes an address/data bus 104 for communicating information, and a processor 106A coupled to bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, e.g. random access memory (RAM), coupled to bus 104 for storing information and instructions for processors 106A, 106B, and 106C.

System 100 also includes computer usable non-volatile memory 110, e.g. read only memory (ROM), coupled to bus 104 for storing static information and instructions for processors 106A, 106B, and 106C. Also present in system 100 is a data storage unit 112 (e.g., a magnetic or optical disk and disk drive) coupled to bus 104 for storing information and instructions. System 100 also includes an optional alphanumeric input device 114 including alphanumeric and function keys coupled to bus 104 for communicating information and command selections to processor 106A or processors 106A, 106B, and 106C. System 100 also includes an optional cursor control device 116 coupled to bus 104 for communicating user input information and command selections to processor 106A or processors 106A, 106B, and 106C. System 100 of the present embodiment also includes an optional display device 118 coupled to bus 104 for displaying information.

Referring still to FIG. 1, optional display device 118 of FIG. 1 may be a liquid crystal device, cathode ray tube, plasma display device or other display device suitable for creating graphic images and alphanumeric characters recognizable to a user. System 100 may also be coupled with an online software security site (not shown). The on-line software security site can be any type of site, including a message posting site, software specific site, software security site, software manufacture site or any other on-line site capable of communicatively coupling to system 100.

Optional cursor control device 116 allows the computer user to dynamically signal the movement of a visible symbol (cursor) on display device 118. Many implementations of cursor control device 116 are known in the art including a trackball, mouse, touch pad, joystick or special keys on alphanumeric input device 114 capable of signaling movement of a given direction or manner of displacement. Alternatively, it will be appreciated that a cursor can be directed and/or activated via input from alpha-numeric input device 114 using special keys and key sequence commands.

System 100 is also well suited to having a cursor directed by other means such as, for example, voice commands. System 100 also includes an I/O device 120 for coupling system 100 with external entities. For example, in one embodiment, I/O device 120 is a modem for enabling wired or wireless communications between system 100 and an external network such as, but not limited to, the Internet.

Referring still to FIG. 1, various other components are depicted for system 100. Specifically, when present, an operating system 122, applications 124, modules 126, and data 128 are shown as typically residing in one or some combination of computer usable volatile memory 108, e.g. random access memory (RAM), and data storage unit 112. In one embodiment, the present technology for enabling access to software security data, for example, is stored as an application 124 or module 126 in memory locations within RAM 108 and memory areas within data storage unit 112.

The computing system 100 is only one example of a suitable computing environment and is not intended to suggest any limitation as to the scope of use or functionality of the present technology. Neither should the computing environment 100 be interpreted as having any dependency or requirement relating to any one or combination of components illustrated in the exemplary computing system 100.

The present technology is operational with numerous other general-purpose or special-purpose computing system environments or configurations. Examples of well known computing systems, environments, and configurations that may be suitable for use with the present technology include, but are not limited to, personal computers, server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

Overview

The on-line information about software security and vulnerabilities, including message boards, mailing lists and web sites, is much valuable to security researchers, system administrators, software vendors, IT professionals, and anyone who is interested in software protection. The volume of such information and the endless sources for such information leads to challenges in accessing the right information easily.

It is appreciated that embodiments of the present technology are well suited for accessing and aggregating any type of information related to software. In one embodiment, the security information includes but is not limited to software vulnerabilities, advisories, discussions, documents, virus/worm related information, security event reporting and/or discussions, etc.

Embodiments of the present technology collect and organize software security data from numerous sources where it can then be analyzed. In other words, the information is aggregated from multiple sources into a single and user friendly place where it can be analyzed according to user specified metrics. The present technology enables access to on-line software security information in an efficient and easy to understand layout. Furthermore, an in-depth study can be performed to mine the data according to a specific user goal.

In one embodiment, the present technology provides a "snap-shot" of what is happening in the security community. For example, the "snap-shot" may show important developments and/or identified software risks, and the average number of message postings for the day, week, month, etc. related to a particular security topic. In one embodiment, the snap-shot data can be compared to historical data to identify trends.

In addition to the security snap-shot, in-depth analysis can be performed on the aggregated information. For example, if a user is interested in a particular security topic, they may want to view message postings related to the particular topic. Embodiments of the technology enable a user to have access to related security information in a single place wherein the data may be aggregated from multiple sources.

Users may also be interested in learning the vulnerabilities of a particular software product. Embodiments of the present technology enable a user to access information related to a particular piece of software at a single place that may be compiled and aggregated from multiple sources. This enables a quick and easy understanding of all security issues related to a product without having to visit multiple sources and perform multiple searches.

Embodiments of the present technology use real-time crawlers to access and retrieve the security data from multiple locations. The information is then compiled and aggregated into a single location where it can be manipulated and researched according to attributes identified from the data. The attributes may include but are not limited to product name, product version, date, security researcher, security site, manufacturer site, news articles, number of message positing, etc. In one embodiment, information is rated for accuracy and how helpful it is. A trust rating can be assigned to various pieces of data. This enables a user to quickly identify and distinguish good data from bad data.

Graphical presentation of the data is an important aspect of the present technology. For example, embodiments of the present technology use graphs, charts, color coding, numerical ratings, etc. for describing key elements in the security community and relationships between different key elements, including products, security researchers, security domain specific keywords, documents, messages, etc. It is appreciated that documents and messages can be the same thing in accordance with the present technology.

Product names are often mentioned under various situations, for example, shopping sites, market investigation reports, news, commercial plans, and so on. One problem is that name recognition and extraction from context is difficult because product naming convention is often complicated. For example, software product names usually mix vendor company name, product name, version, edition, language pack, platform, or even an acronym and alias.

Embodiments of the present technology recognize and extract product names from aggregated software security data. In one embodiment, partial matches of known attributes are used to identify and extract product names from the aggregated software security data.

Embodiments of the present technology are described in the context of software security data. However, it is appreciated that embodiments of the present technology are also well suited to be used for aggregating and analyzing other types of data. The present technology is useful for aggregating and visualizing any type of large scale and multi-dimensional data in a way that enables a user to analyze the data through a graphical user interface. The embodiments described below are in the context of software security data for purposes of illustration and are not intended to limit the scope of the technology.

Architecture

Figure 2:
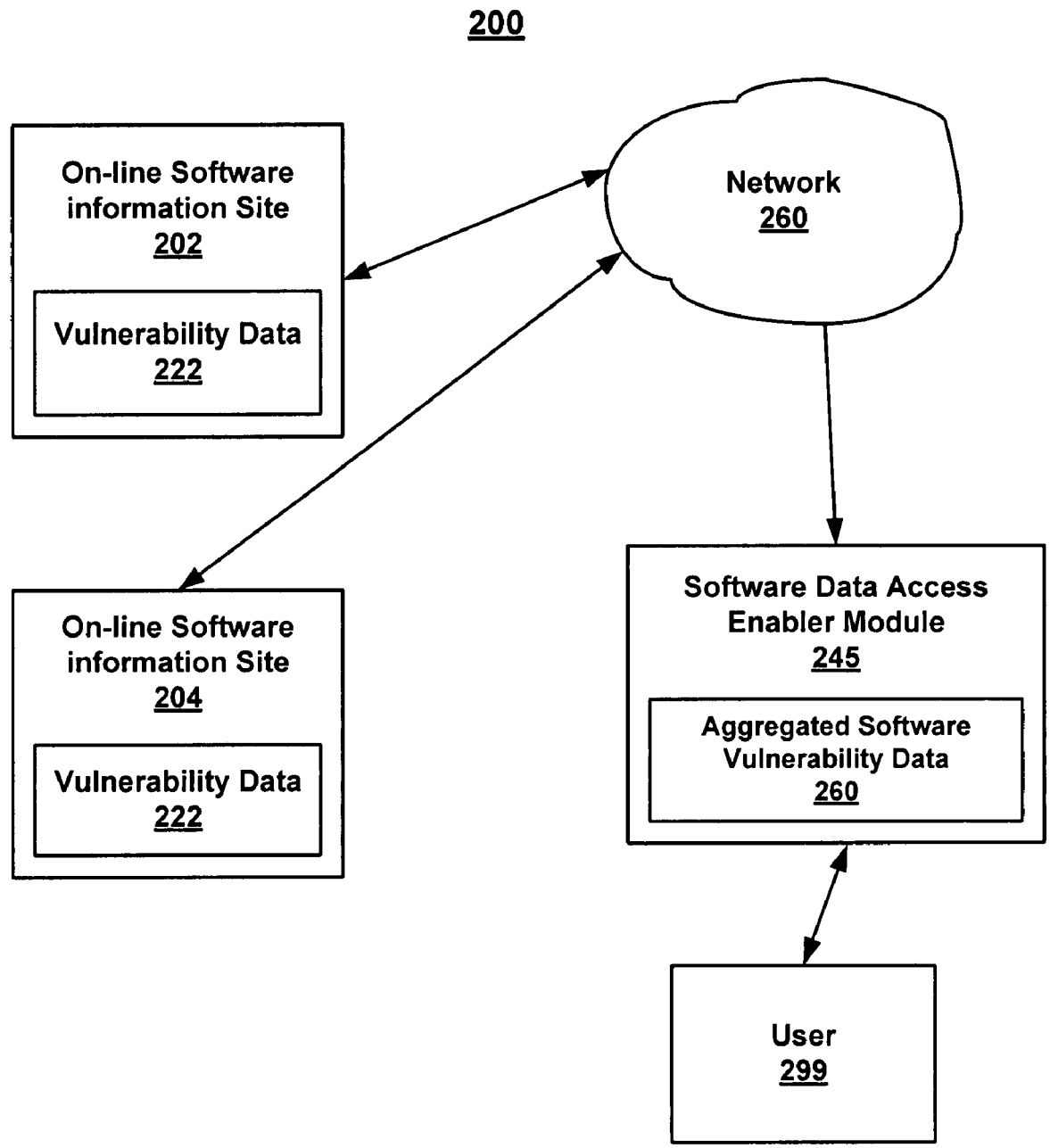
FIG. 2 is a block diagram of an exemplary network environment where software security data is accessed from a plurality of locations and aggregated at a single location in accordance with embodiments of the present technology for identifying attributes of software security data.

FIG. 2 is a block diagram of an exemplary network environment 200 where software security data is accessed from a plurality of locations and aggregated at a single location in accordance with embodiments of the present technology for enabling graphical representation of software security data. The software security data access enabler module 245 crawls sites 202 and 204 over network 260 for security data 222. The security data from sites 202 and 204 is aggregated and stored in a single location 260.

It is appreciated that the on-line security sites 202 and 204 may be web sites, data bases, message boards, or any other on-line source for software security information. The network 260 may be the Internet, however, it is appreciated that network 260 could be any network capable of communicatively coupling the on-line sources 202 and 204 to the software security data access enabler module 245.

The software security data access enabler module 245 may be part of a computer system such as a web server. However, it is appreciated that the software security data access enabler module 245 could be part of any computer system capable of aggregating software security data from a plurality of sources.

Figure 3:
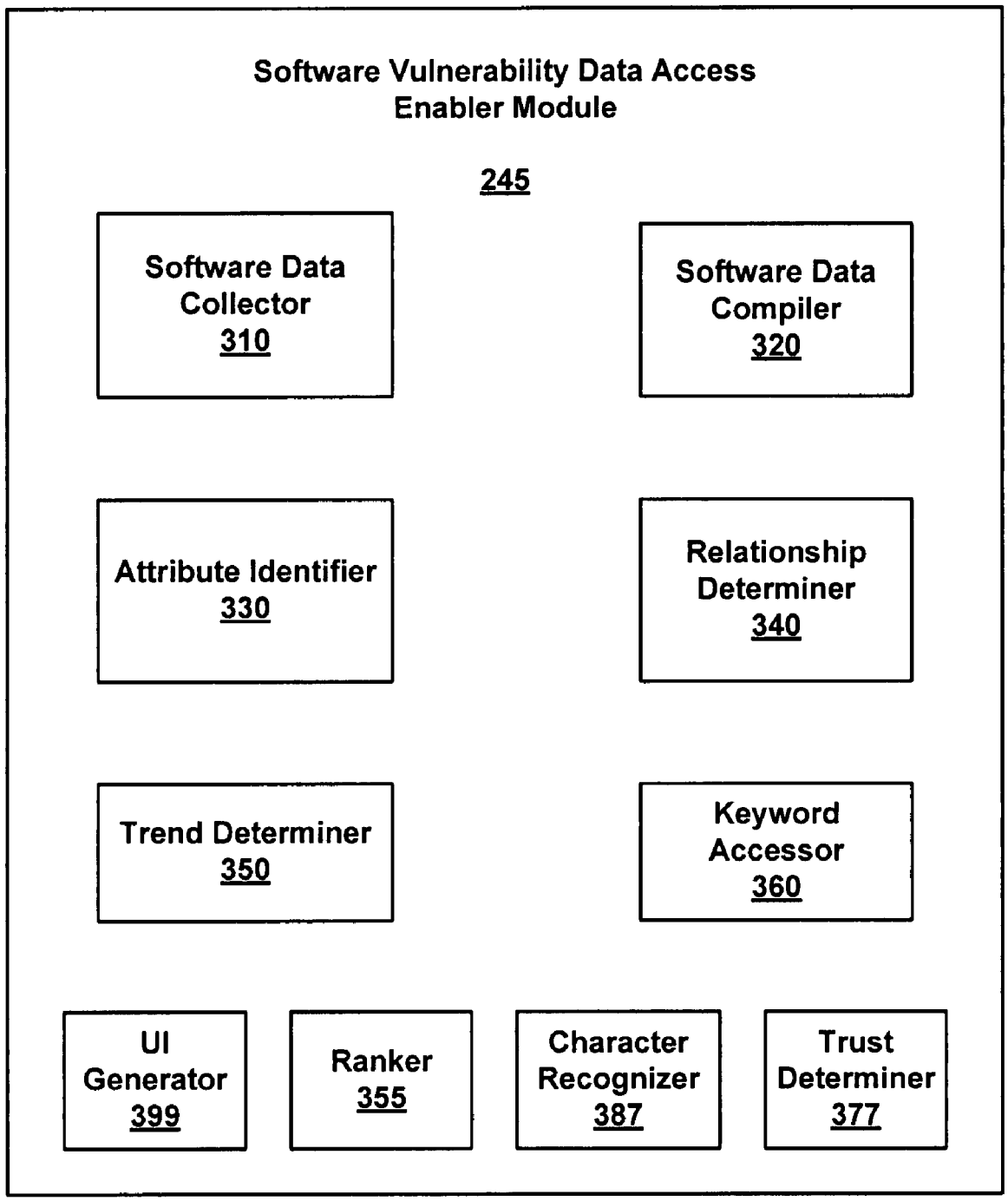
FIG. 3 is a block diagram of an exemplary software security access enabler module in accordance with embodiments of the present technology for identifying attributes of software security data.

FIG. 3 is a block diagram of an exemplary software security access enabler module 245 in accordance with embodiments of the present technology for enabling graphical representation of software security data.

Data collector 310 collects the software security data from a plurality of locations. In one embodiment, data collector 310 includes or is coupled with a web crawler. The web crawler navigates the on-line sites for any new or changed data. The data is then aggregated by the software security data compiler 320. It is appreciated that any number of methods and systems could be used to crawl the on-line sites for the software security data in accordance with the present technology for enabling access to aggregated on-line software security data.

An attribute identifier 330 identifies attributes from the data collected from the plurality of sites. The attribute identifier may enable organization of the data according to the identified attributes. For example, if a piece of data is identified as a message board posting, it may be stored along with other message board postings.

A relationship determiner 340 determines relationships between different pieces of data. For example, the relationship determiner 340 could identify two or more messages related to the same topic. In another embodiment, the relationship determiner 340 identifies two software products related to the same vulnerabilities and/or security issues. The relationship determiner 340 may also identify products with one or more keywords. In one embodiment, the keywords are retrieved from message postings associated with the product. In one embodiment, the relationship is quantified in the form of a rating. For example, the higher the rating, the more related the data is. In another embodiment, the rating is color coded. When data is highly related, a particular color is used. It is appreciated that the relationship determiner 340 can perform many different statistical calculations and complex mathematical calculations that can be used to determine relationships between two or more pieces of data.

In one embodiment, the relationship determiner generates a graphical representation that can be displayed on a graphical user interface. For example, the relationship determiner could generate a graph showing the number of related messages within the last week. In one embodiment, the relationship determiner may provide data to the UI generator 399 so that the UI generator 399 can generate the graphical representation that is provided to the graphical user interface.

A trend determiner 350 identifies trends in the compiled data. For example, the trend determiner may determine whether the number of posts related to a particular topic are increasing or decreasing over a predetermined period of time. The trend determiner 350 could also identify the trends associated with a particular product. For example, the trend identifier 350 could determine whether the number of vulnerabilities associated with a piece of software are increasing or decreasing. It is appreciated that the trend determiner 350 can perform many different statistical calculations and complex mathematical calculations that can be used to determine trends.

In one embodiment, the trend determiner 350 generates a graphical representation that can be displayed on a graphical user interface. For example, the trend determiner could generate a graph showing the number of messages within the last week that are related to a particular topic. In one embodiment, the relationship determiner may provide data to the UI generator 399 so that the UI generator 399 can generate the graphical representation that is provided to the graphical user interface.

A key word accessor 360 can be used to identify data that is associated with a keyword. In one embodiment, the key word accessor is a user interface that can be used to search data that includes the specified keyword. However, in another embodiment, the keyword accessor is "smart" and can determine words that are closely related to a keyword. In this embodiment, the keyword accessor retrieves data that is related to a particular keyword, even data that may not actually include the specified keyword. It is appreciated that the keyword accessor may communicate with other modules, such as the relationship determiner 340 to perform such operations. On another embodiment, a character recognizer 387 is used to determine relationships between data.

In one embodiment, an algorithm is used to extract keywords from documents and/or messages. In one embodiment, the algorithm is used to determine a topic or theme of the particular document or message. In one embodiment, the algorithm recognizes abbreviations, aliases, misspellings, etc. Extracting keywords and/or part of keywords may be preformed by or in conjunction with the character recognizer 387.

For example, the character recognizer 387 may include a data base of words and related words. In one embodiment, the character recognizer recognizes a misspelled word because it recognizes a particular portion of the word. In addition to spelling errors, the character recognizer recognizes that different versions of a particular product are related to each other even though the names of the products may be different.

A data ranker 355 can be used to rank particular sets of data. For example, data can be ranked according to a trust level determined by trust determiner 377. The ranker can also be used to rank how closely a set of data matches, for instance a specified key word. Exact matches would be ranked higher than ones identified by the character recognizer that may not be an exact match to the specified keyword.

The trust determiner 377 maintains a record of how trustworthy a particular piece of data is. For example, there are many sites that have user ratings. The user ratings can be used to determine a level of trust associated with a particular site. Information accessed from sites that have higher ratings is assigned higher trust ratings than information accessed from sites that are not as trusted.

It is appreciated that the ratings may not be site specific. It is appreciated that any number of metrics could be used to rate the data and determine a level of trust. For example, a person who posts information frequently on message boards may have a higher trust rating than a person making a first post.

Operation

Figure 4:
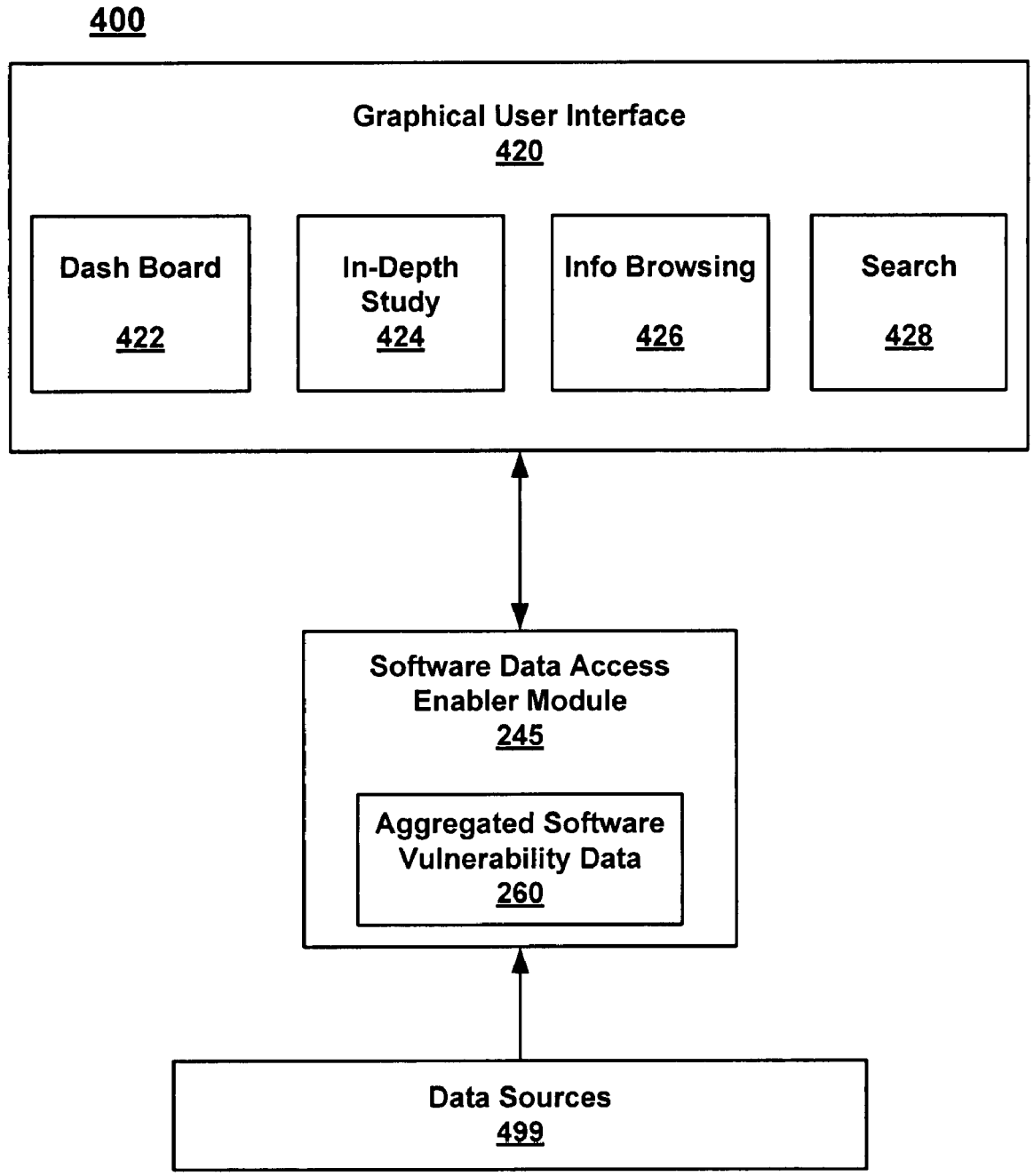
FIG. 4 is a block diagram of an exemplary graphical user interface in accordance with embodiments of the present technology for identifying attributes of software security data.

FIG. 4 is a block diagram of an exemplary graphical user interface in accordance with embodiments of the present technology for enabling access to aggregated on-line software security data. The software security data access enabler module 245 collects data from data sources 499. The graphical user interface 420 can be used to present analysis of the aggregated software security data 260. It is appreciated that the modules of FIG. 4 could be any graphical representation and/or analysis of the data accessed from a plurality of locations in accordance with embodiments of the present technology for enabling access to security data.

In one embodiment, the graphical user interface 420 includes a dashboard portion 422, an in-depth study portion 424, an info browsing portion 426 and a search portion 428. In one embodiment, the user can select the modules to manipulate and study software security data visually.

These four portions provide different levels of information to the user. For example, the dashboard 422 provides an overview of what's going on in the security community. The in-depth study 424 allows users to drill down to a specific area of the security community, such as researching a specific software product. Info-browsing 426 allows a user to reference organized raw data, such as message postings. The search portion 428 enables a user to search any terms in the security domain and presents the search results in a well organized way.

The dashboard 422 can be used to present the snap-shot that was described above. The dashboard 422 is intended to provide a quick update as to what is going on in the on-line software security community. Specifics of the dashboard 422 are provided in conjunction with the description of FIG. 6.

The in-depth study 424 can be used to perform statistical and mathematical operations on the data to analyze the data collected from various sources. The in-depth study 424 is intended to analysis of what is going on in the on-line software security community. Specifics of the in-depth study are provided in conjunction with the description of FIG. 7.

The info browsing portion 426 enables a user to navigate the raw data collected from the various sites. For example, by selecting the info-browsing portion of the graphical user interface 420, a user can browse messages according to data source, software product, security researcher, topic, keyword, etc.

The search portion 428 enables input of query terms. In one embodiment, related advisories, related posts, related security researchers and related posters are returned along with the query results of the search term. It is appreciated that any number of results could be returned in response to a specific search term in accordance with embodiments of the present technology for enabling access to aggregated on-line software security data.

Figure 5:
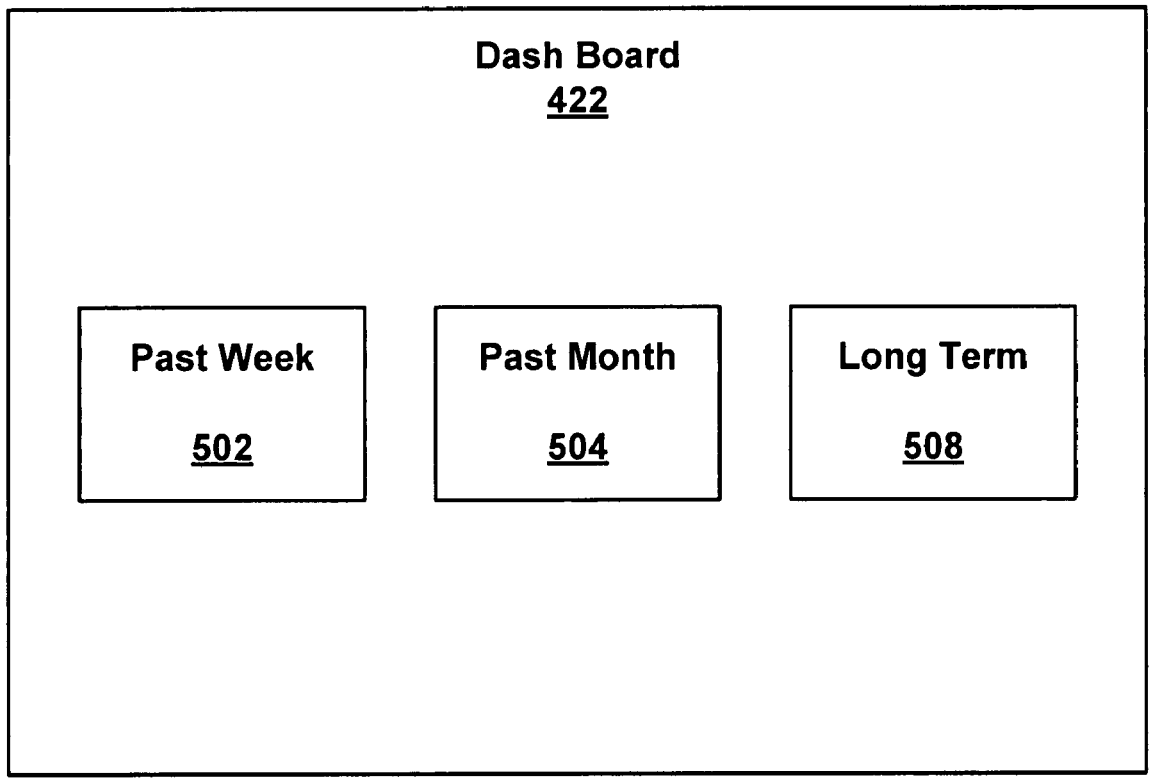
FIG. 5 is a block diagram of an exemplary dashboard in accordance with embodiments of the present technology for identifying attributes of software security data.

FIG. 5 is a block diagram of an exemplary dashboard 422 in accordance with embodiments of the present technology for enabling access to aggregated on-line software security information. In one embodiment, the portions of dashboard 422 can be customized according to what is important to the user. It is appreciated that the portions of the dashboard 422 could be graphical representations and/or analysis of the data aggregated from a plurality of sources in accordance with the present technology for enabling access to security data.

As stated previously, the dashboard is intended to provide overview information quickly. It provides a snap shot of what is happening in the on-line software security community. For example, the dashboard may include a snap shot of what has happened in the past week 502. The past week 502 may include, for example, the top five topics from the past week. The past week 502 could also include the most relevant or important message postings from the past week. The past week portion 502 may include any number of graphs or other graphical representations of data so that the user can easily understand and comprehend vast amounts of data associated with what has happened in the past week quickly and easily.

Accordingly, the dashboard also includes a portion that indicates important data from the past month 504. It provides a more in-depth study of what has been going on in the past month compared to the snap shot described above. The past month 504 may include, for example, the top five topics from the past month. The past month 504 could also include the most relevant or important message postings from the past month. The past month 504 may also include a daily trend of security messages posted. The past month portion 504 may include any number of graphs or other graphical representations of data so that the user can easily understand and comprehend vast amounts of data associated with what has happened in the past month quickly and easily.

The dashboard may also include a long-term trend portion 506. The long-term trend portion can be used to analyze data that is older than one month. The long-term trend portion 508 enables a user to see trends in the on-line security environment that may not show up in the past week portion 502 or the past month portion 504. In one embodiment, the past week 502 data, past month 504 data, daily trends data can be compared to the long-term data.

In one embodiment, included with the past week info 502, past month info 504 or long-term info 508 is a daily trend portion for identifying what is going on in the on-line software community that day. The daily trend may show data such as the number of postings for the day, the top topics of the day, the number of persons visiting security sites, etc. The daily trend portion may include any number of graphs or other graphical representations of data so that the user can easily understand and comprehend vast amounts of data associated with what has happened in a day quickly and easily.

Figure 6:
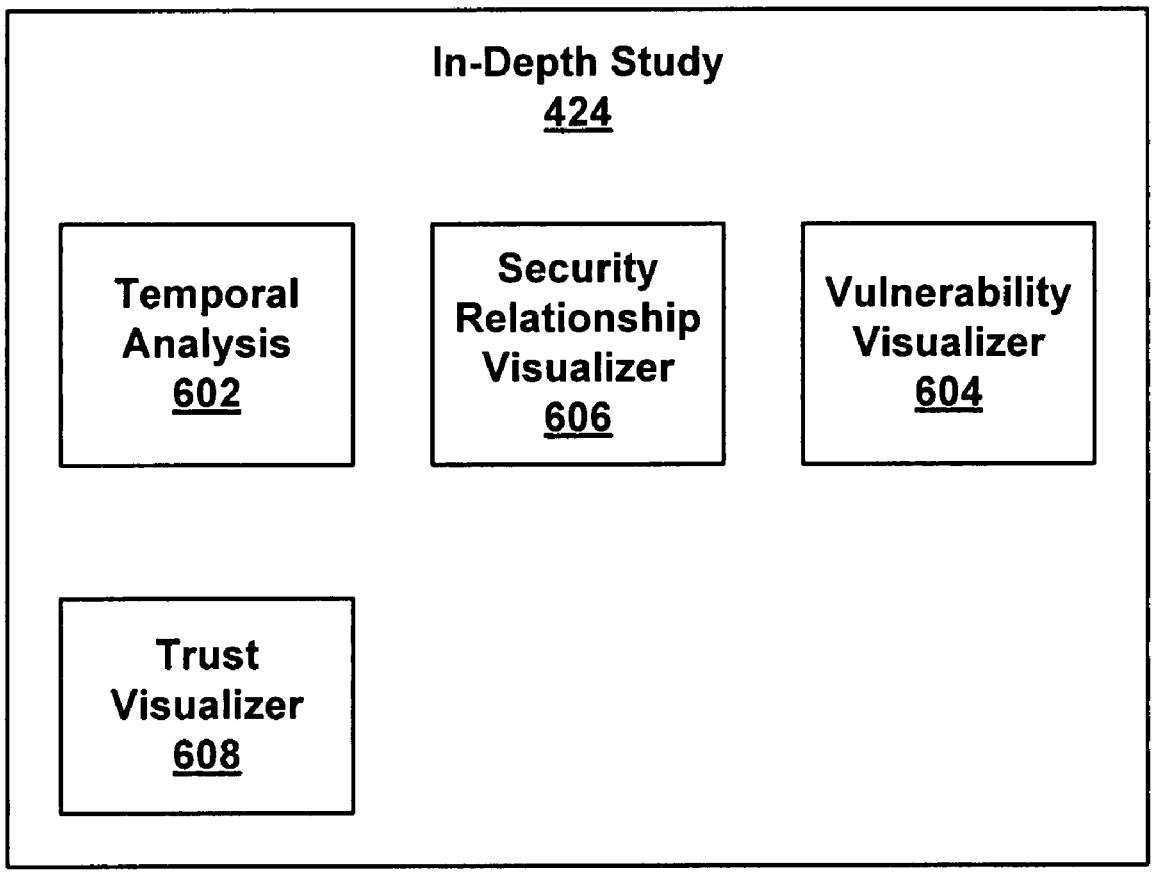
FIG. 6 is a block diagram of an exemplary in-depth study in accordance with embodiments of the present technology for identifying attributes of software security data.

FIG. 6 is a block diagram of an exemplary in-depth study 424 in accordance with embodiments of the present technology for enabling access to aggregated on-line software security information. The in-depth study 424 can be used to perform statistical operations on the data according to particular attributes of the data which enables a user to drill down to specific detail information associated with specific software products or security researchers or security domain-specific key words. It also enables a user to navigate among relationship graphs of key elements of the security community. It is appreciated that the portions of the in-depth study 424 could be graphical representations of the data and/or analysis of the data aggregated from a plurality of sources in accordance with the present technology for enabling access to security data.

For example, the in-depth study portion enables temporal analysis 602 of the data aggregated from a plurality of sources. The temporal analysis 602 enables a user to see the overall trend of the number of messages associated with a particular topic, keyword, researcher, product, etc. It also enables a user to navigate among relationship graphs of key elements of the security community. It is appreciated that the temporal analysis can be used to perform statistical and mathematical operations on any number of data attributes. The analysis can be used to generate a graphical representation of the temporal analysis results in a clear and easy to understand format.

The in-depth study also includes a security visualizer 604. The security visualizer 604 enables a user to gain an overall understanding of all related issues of a product easily and quickly. The security visualizer 604 enables a user to drill down through the aggregated data to see all advisories, postings, related messages, etc. associated with specific search terms and/or attributes.

The in-depth study also includes a security relationship visualizer 606. The security relationship visualizer 606 enables a user to gain an overall understanding of all security relationships of key security elements (such as a product, a researcher, a domain-specific keyword) easily and quickly and be able to navigate from one element to another related security element and view all relationships of the new selected element. The security relationship visualizer 606 enables a user to drill down through the aggregated data to see all advisories, postings, related messages, etc. associated with keywords and documents. The security relationship visualizer 606 can generate graphical representations of the security relationships.

Similar to the security relationship visualizer, the in-depth study 424 also includes a trust visualizer 608. The trust visualizer 608 enables a user to see a trust rating associated with particular security data. The trust level could be conveyed, for example, with a numerical or color coded rating. It is appreciated that the trust information could be incorporated into one of the other portions described above.

Identifying Attributes form Portions of Software Security Data

Embodiments of the technology are used to identify attributes of data portions based on exact matches and based on partial matches. For example, software product names are often mentioned under various situations. One problem is recognizing a particular product name from a set of data. Embodiments of the technology use a finite state machine to perform text extraction to identify attributes from a set of data. In one embodiment, the data is searched for exact matches to known attributes. Next, the text is searched for partial matches.

The present technology will be described in the context of product name recognition. However, it is appreciated that embodiments of the present technology are well suited to be used to identify any type of attributes from a set of data.

In one embodiment, an algorithm is defined to perform the identification of attributes from a set of data. It is appreciated that the following algorithm is used for explanation purposes and it is appreciated that many different methods could be used to perform attribute recognition from a set of data in accordance with embodiments of the present technology.

In one embodiment, the finite state machine can be defined using the following variables: $(\Sigma, S, s_o, \sigma, F)$ where $\Sigma$ is the input alphabet, which can be the set of all symbols in the target domain;

S is a finite non empty set of states;

$s_o$ is the initial state, an element of S;

$\sigma$ is the state transition function $\delta$: $S \times \Sigma \rightarrow S$;

F is the set of all final states, a subset of S.

In one embodiment, a length variable window is used to scan the candidate text snippets containing a target attribute. In one embodiment, the target attribute is a product name. A transition from state "a" to state "b" is triggered if the text under the scan window from the current point "a" is accepted by state "b." The acceptance decision for each state can be variable. It is appreciated that several kinds of criteria can be used to determine an exact match or partial match.

For example, a match decision can be dictionary based. If the text segment or any of its equivalent transformed format is contained by the dictionary, a match is identified. Identification of attributes can also include the use of acronyms, alias mappings, case of letter conversions, misspellings, abbreviations, etc.

In one embodiment, a match threshold is used to help in determining a match. For example, a match calculation can be determined for a particular snippet of text. A value associated with how well a snippet matches a known attribute is calculated. The value is then compared to a threshold value. If the value exceeds the threshold, the snippet is determined to be a match. If the value is less than the threshold, the snippet is determined to not match. It is appreciated that many different methods and calculations can be used to determine how well a snippet of data matches a known attribute in accordance with embodiments of the present technology.

Figure 7A:
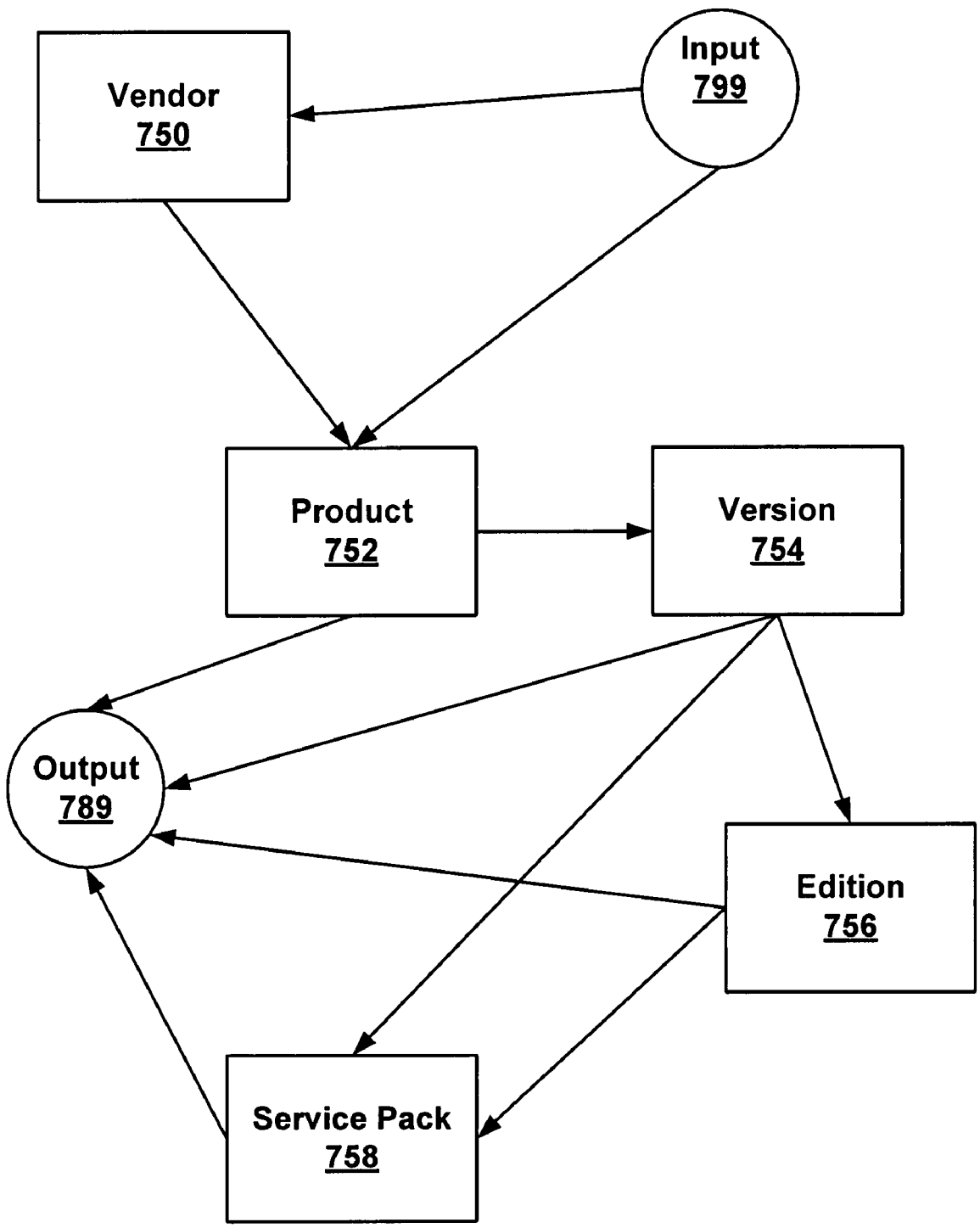
FIG. 7A is a block diagram of a text string in accordance with embodiments of the present technology for identifying attributes of software security data.

FIG. 7A is a block diagram of an exemplary finite state machine that can be used to recognize attributes in accordance with embodiments of the present technology. In one embodiment, the input data is a snippet of text selected from the aggregated security data. The input 799 to the state machine is the target data being examined. The input data is examined by the vendor stage 750 or the product stage 752. If the input data passes the vendor stage, it is then examined by the product stage 752. At the product stage 752, a particular product name may be identified at output 789.

To find a more complete identification of the input data, the input data can be examined by the version stage 754. From the version stage, the output 789 could include a product name and a version identifier. From the version stage 754, the input data can be examined by the edition stage 756 or the service pack stage 758. An output from the edition stage 756 would include a product name, a version identifier and an edition identifier.

An output from the service pack stage 758 could include a product name, a version identifier, an edition and a service pack. It is appreciated that the output from any of the stages could include any combination of the vendor name, product name, version identifier, edition or service pack. It is also appreciated that the finite state machine of FIG. 7A is an example and that any number of finite state machines with any number of stages could be used in accordance with embodiments of the present technology.

Figure 7B:
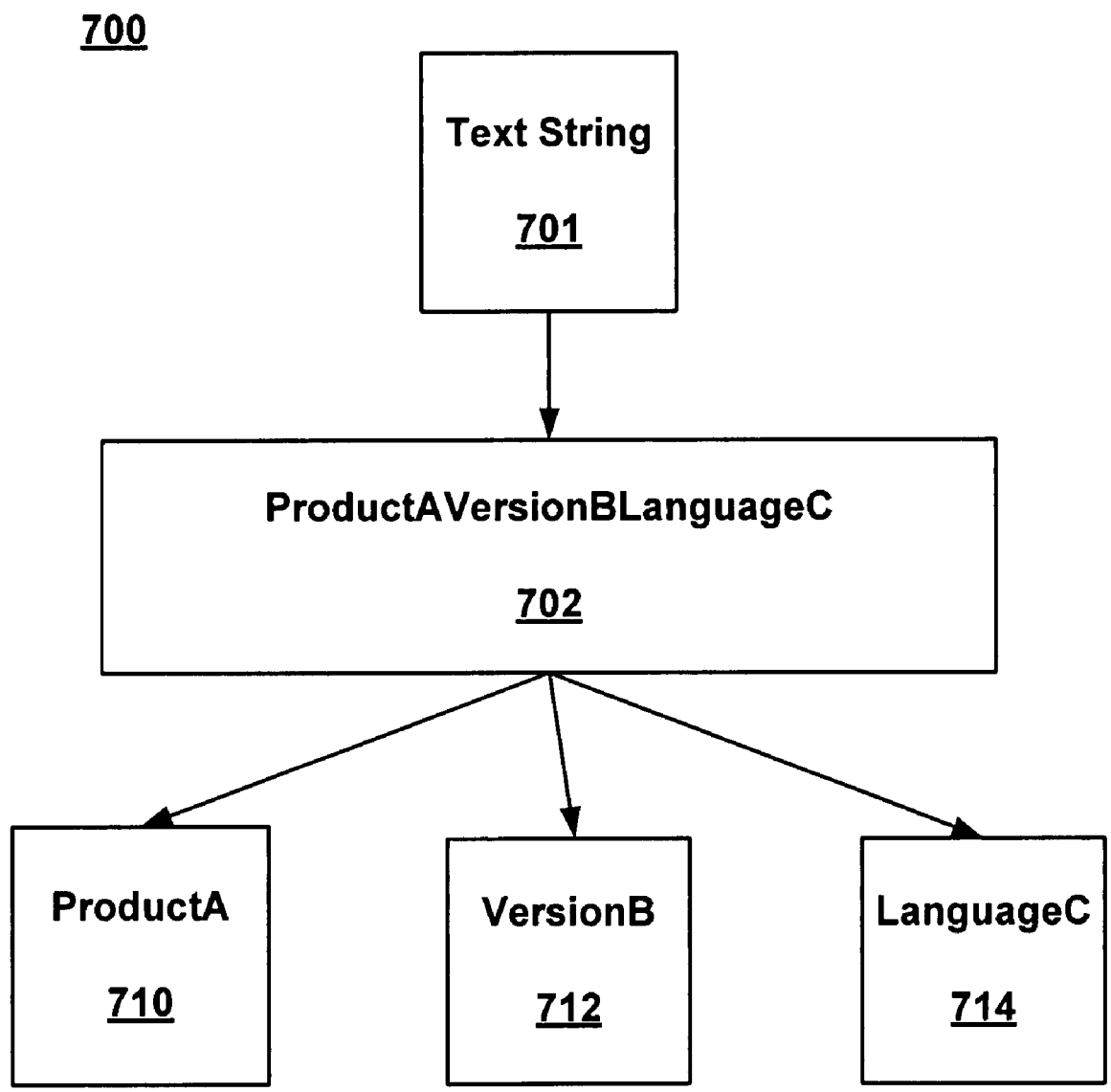
FIG. 7B is a block diagram of an exemplary finite state machine in accordance with embodiments of the present technology for identifying attributes of software security data.

FIG. 7B is a block diagram 700 of an exemplary snippet of text data that can be examined by the finite state machine described in conjunction with FIG. 7A in accordance with embodiments of the present technology. In one embodiment, a snippet of text is extracted from a text string. If the snippet can be mapped to a standard attribute, the entire string is also associated with the standard attribute. In this example, the text snippet "ProductAversionBlanguageC" 702 is extracted from text string 701 and examined for a possible match to known attributes. The snippet 702 can be broken down into a plurality of portions "ProductA" 710, "VersionB" 712, and "LanguageC 714."

A match of snippet 702 to attribute "Product A," for example can be determined based on examining the portions 710, 712 and 714 for a match to known entries. For example, the portion "ProductA" 710 is not a direct match to "Product A," but is a partial matches to "Product A." In response to determining a match of "ProductA" 710 to "Product A," the entire text string 701 is mapped to the attribute "Product A." When a user searches for text related to "Product A," the text string 701 could be provided to the user.

It is appreciated that expressions can be written in different formats. For example, the year 2000 can be written as 2K. Embodiments of the present technology consider different ways an expression can be written. In addition, the present technology takes into consideration misspellings, missing text, abbreviations, synonyms, etc. when deciding if a snippet is a match.

In one embodiment, the present technology may setup a coding system. Referencing to this system, different format of the expressions could be transformed to unique component code. Just like the notion of geocoding, which digitalizes the geographic addresses, product names can also be digitalized. This is useful for a computer to process.

Figure 8:
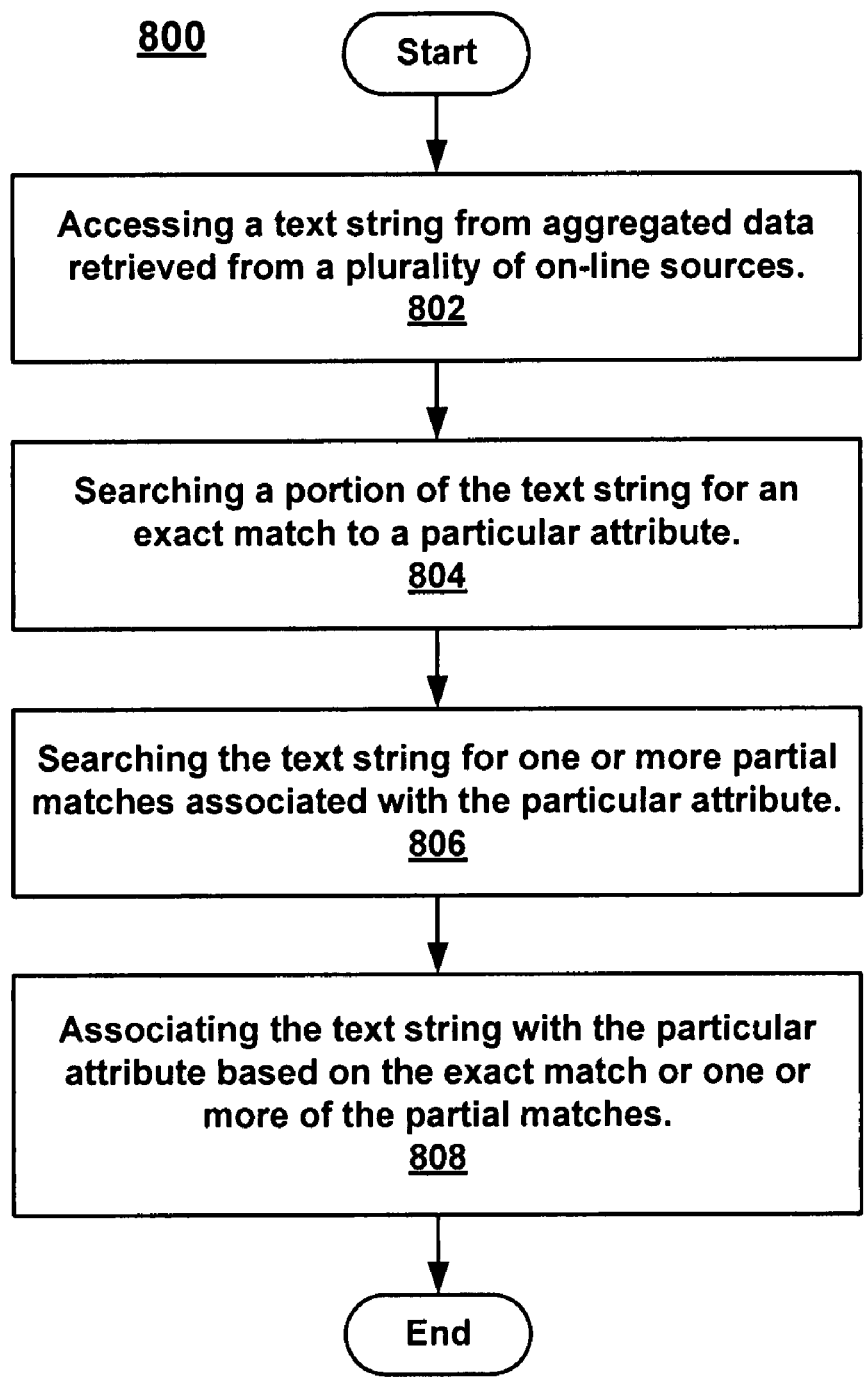
FIG. 8 is a data flow diagram of an exemplary method for enabling graphical representation of software security data in accordance with embodiments of the present technology for identifying attributes of software security data.

FIG. 8 is a data flow diagram of an exemplary method 800 for identifying attributes of a portion of data in accordance with embodiments of the present technology.

At 802, 800 includes accessing a text string from aggregated data accessed from a plurality of on-line sources. In one embodiment, a crawler performs real-time data acquisitions from a plurality of on-line sites. Embodiments of the present technology aggregate data from a plurality of sources and enable access to the data at a single location where a user can quickly and easily examine the data and perform analysis of the data. In one embodiment, the aggregated is presented in a graphical fashion to the user through a graphical user interface. In one embodiment, a text snippet (e.g., text string) of the aggregated is examined for a possible match to known attributes.

At 804, 800 includes searching a portion of the text string for an exact match to a particular attribute. In one embodiment, the portion of the text string is compared to a dictionary of known terms. In one embodiment, a finite state machine can be used to determine a match.

At 806, 800 includes searching the text string for one or more partial matches associated with the particular attribute. In one embodiment, algorithms are used to determine a level of match between portions of the text string and known partial matches. In one embodiment, a finite state machine can be used to determine a match. In one embodiment, a probability is calculated for how well a particular portion of the text string matches a known attribute or known partial match of a known attribute. In one embodiment, a threshold value is used to determine whether a portion of the text string matches an attribute or partial match of an attribute. When the probability exceeds the threshold level, the portion is determined to be a match. If the probability is lower than a threshold, the portion is determined to not be a match.

At 808, 800 includes associating the text string with the particular attribute based on the exact match or one or more of the partial matches. As stated above, if a match is determined in 804 or 806, the entire string is associated with the matched term(s).

For example, suppose the text string is a message posting. The message posting is searched for known product names and partial matches to product names. If a match is found, the entire message posting can be associated with the matched product name(s). When a user is searching for data related to the particular product name, the message posting can be provided to the user.

In addition to providing the user the messages associated with a particular product, embodiments of the present technology categorize the data automatically based on recognition of attributes of the data. The categories the data is organized into can be a hierarchical (e.g., by vendor, big version, small version, etc.). In one embodiment, the user can browse these categories.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for identifying attributes of a portion of aggregated security data, the method comprising:
    aggregating security data that is retrieved by real-time crawlers from a plurality of on-line sources into a single location to provide aggregated security data that is associated with at least one of one or more vulnerabilities or one or more security issues;
    selecting, by a computing device, a text string from the aggregated security data;
    searching a portion of the selected text string for an exact match with a particular attribute, the particular attribute being included in a plurality of attributes that includes a name of a product and a version of the product;
    searching the portion of the selected text string for a partial match with the particular attribute, the partial match being determined based on a probability exceeding a threshold value, the probability being determined by a finite state machine, the partial match taking into consideration misspellings, missing text, abbreviations, and synonyms;
    associating the selected text string in its entirety with the particular attribute based on the exact match or the partial match of the portion of the selected text string;
    determining that a user searches for information related to the particular attribute; and
    providing the entirety of the selected text string for the user, based on the selected text string in its entirety being associated with the particular attribute and further based on a rank of the selected text string as compared to one or more other text strings, in response to determining that the user searches for the information, the rank indicating how closely the portion of the selected text string matches the particular attribute, the rank being relatively higher if the selected text string includes the exact match, the rank being relatively lower if the selected text string includes the partial match but not the exact match.

2. The method of claim 1 further comprising:
    determining a plurality of components of said particular attribute; and
    associating the partial match with one or more components of the plurality of components.

3. The method of claim 2 further comprising:
    determining a probability that one or more components of the plurality of components are associated with the partial match.

4. The method of claim 1, wherein providing the entirety of the selected text string comprises:
    providing the entirety of the selected text string further based on a trust rating associated with a site from which the selected text string is accessed, the trust rating indicating a level of trust that users associate with the site.

5. The method of claim 1, wherein the selected text string includes a message posting from an on-line site; and
    wherein the particular attribute includes the name of the product.

6. The method of claim 1, further comprising:
    organizing the selected text string in the aggregated security data based on the particular attribute.

7. At least one data storage device comprising instructions that when executed cause a computer system to perform steps comprising:
    aggregating security data that is retrieved by real-time crawlers from a plurality of on-line sources into a single location to provide aggregated security data that is associated with at least one of one or more vulnerabilities or one or more security issues;
    searching a portion of a selected text string that is selected from the aggregated security data for an exact match to a particular attribute, the particular attribute being included in a plurality of attributes that includes a name of a product and a version of the product;
    searching the portion of the selected text string for a partial match with the particular attribute, the partial match being determined based on a probability exceeding a threshold value, the probability being determined by a finite state machine, the partial match taking into consideration misspellings, missing text, abbreviations, and synonyms;
    associating the selected text string in its entirety with the particular attribute based on the exact match or the partial match of the portion of the selected text string;
    determining that a user searches for information related to the particular attribute; and
    providing the entirety of the selected text string for the user, based on the selected text string in its entirety being associated with the particular attribute and further based on a rank of the selected text string as compared to one or more other text strings, in response to determining that the user searches for the information, the rank indicating how closely the portion of the selected text string matches the particular attribute, the rank being relatively higher if the selected text string includes the exact match, the rank being relatively lower if the selected text string includes the partial match but not the exact match.

8. The at least one data storage device of claim 7, wherein the instructions when executed cause the computer system to organize a portion of said aggregated security data according to said particular attribute.

9. The at least one data storage device of claim 7, wherein the instructions when executed cause the computer system to perform the steps further comprising:
    determining a plurality of components of the particular attribute; and
    associating the partial match with one or more components of the plurality of components.

10. The at least one data storage device of claim 9, wherein the instructions when executed cause the computer system to determine a probability that one or more components of the plurality of components are associated with the partial match.

11. The at least one data storage device of claim 9, wherein the instructions when executed cause the computer system to reorder one or more components of the plurality of components and map to a standard form that complies with a uniformed coding system of the particular attribute.

12. The at least one data storage device of claim 7, wherein the instructions for providing the entirety of the selected text string comprise:
   instructions for providing the entirety of the selected text string further based on a trust rating associated with a site from which the selected text string is accessed, the trust rating indicating a level of trust that users associate with the site.

13. The at least one data storage device of claim 7, wherein the selected text string includes a message posting from an on-line site; and
   wherein the particular attribute includes the name of the product.

14. A system for enabling a graphical representation of software security data comprising:
   a computing device;
   a data collector module configured for operating on the computing device and for selecting aggregated security data retrieved by real-time crawlers from a plurality of on-line sources, the aggregated security data being associated with at least one of one or more vulnerabilities or one or more security issues;
   an exact match data searcher module configured for operating on the computing device and for searching a portion of a selected text string that is selected from the aggregated security data for an exact match to a particular attribute, the particular attribute being included in a plurality of attributes that includes a product name and a product version;
   a partial match data searcher module configured for operating on the computing device and for searching the portion of the selected text string for a partial match with the particular attribute, the partial match taking into consideration misspellings, missing text, abbreviations, and synonyms;
   a key word accessor configured to operate on the computing device and to determine the partial match based on a probability exceeding a threshold value, the probability being determined by a finite state machine; and
   a data attribute associator module configured for operating on the computing device and for associating the selected text string in its entirety with the particular attribute based on the exact match or the partial match of the portion of the selected text string, the data attribute associator module further configured for determining that a user searches for information related to the particular attribute, and the data attribute associator module further configured for providing the entirety of the selected text string for the user based on the selected text string in its entirety being associated with the particular attribute and further based on a rank of the selected text string as compared to one or more other text strings in response to a determination that the user searches for the information, the rank indicating how closely the portion of the selected text string matches the particular attribute, the rank being relatively higher if the selected text string includes the exact match, the rank being relatively lower if the selected text string includes the partial match but not the exact match.

15. The system of claim 14 further comprising:
   a data component determiner configured to operate on the computing device and to determine a plurality of components of the particular attribute and to associate the partial match with one or more components of the plurality of components.

16. The system of claim 15, wherein the data component determiner is further configured to determine a probability that one or more components of the plurality of components are associated with the partial match.

17. The system of claim 15, wherein the data component determiner is further configured to reorder one or more components of the plurality of components and to map to a standard form that complies with a uniformed coding system of the particular attribute.

18. The system of claim 14, wherein the selected text string includes a message posting from an on-line site; and
   wherein the particular attribute includes the name of the product.

19. The system of claim 14, wherein the data attribute associator module is configured for providing the entirety of the selected text string for the user further based on a trust rating associated with a site from which the selected text string is accessed, the trust rating indicating a level of trust that users associate with the site.

20. The system of claim 15, wherein the selected text string is organized in the aggregated security data based on the particular attribute.

* * * * *